Figure 1:
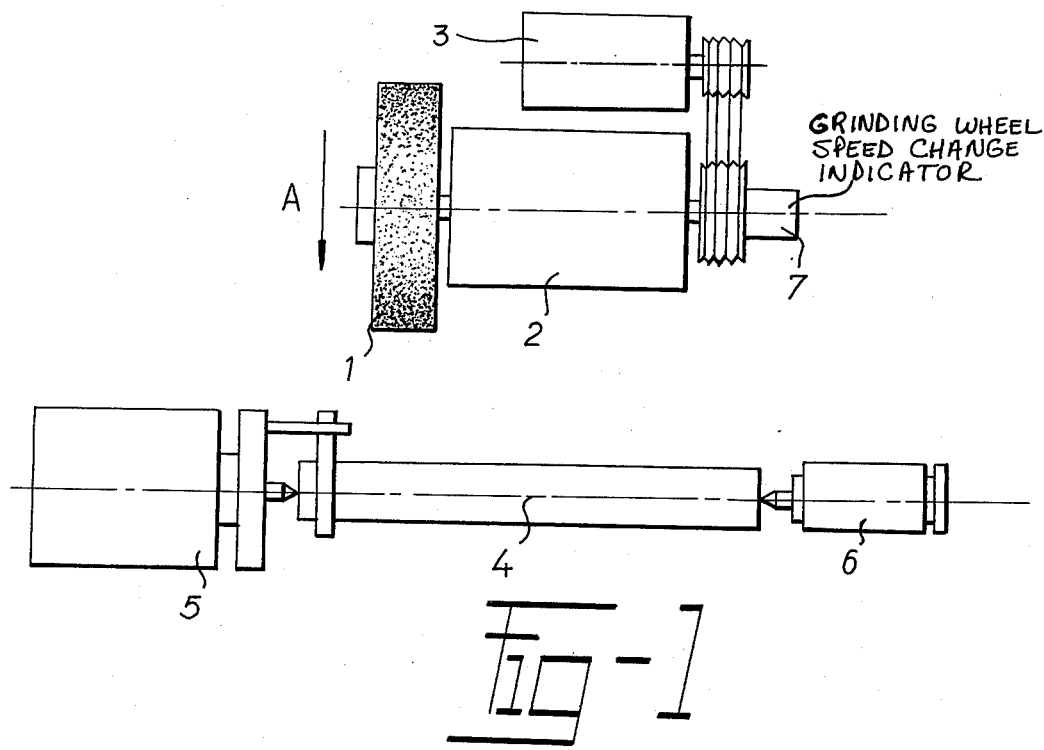

United States Patent [19]

Stepanek

[11] 3,965,622
[45] June 29, 1976

[54] DEVICE FOR INDICATING THE TOUCHING OF A GRINDING WHEEL AND A WORKPIECE

[75] Inventor: Karel Stepanek, Prague, Czechoslovakia

[73] Assignee: Vyzkumny ustav obrabecich stroju a obrabeni, Prague, Czechoslovakia

[22] Filed: Jan. 20, 1975

[21] Appl. No.: 542,452

[30] Foreign Application Priority Data

Jan. 21, 1974 Czechoslovakia .................... 375-74

[52] U.S. Cl. ............................ 51/165 R; 51/134.5; 51/165.92 R; 73/517 A
[51] Int. Cl.² ............................................. B24B 49/00
[58] Field of Search .......... 51/165 R, 165.92, 134.5; 73/517 A

[56] References Cited
UNITED STATES PATENTS

| | | |
|---|---|---|
| 2,381,211 | 8/1945 | Crittenden .................... 73/517 A X |
| 2,753,475 | 7/1956 | Curl .............................. 73/517 A X |
| 2,961,808 | 11/1960 | Dunigan ......................... 51/165.92 |
| 3,136,098 | 6/1964 | Backer ........................... 51/165.92 |
| 3,443,341 | 5/1969 | Honda ............................. 51/165 R |

*Primary Examiner*—Harold D. Whitehead

[57] ABSTRACT

A device for indicating the touching of a grinding wheel and a workpiece. On a shaft connected to a spindle of a grinding wheel there is fixed a radially slotted or gear wheel. On the shaft there is also rotatably mounted another identical slotted wheel, which is connected by means of a spring to the shaft, and a stable supporting plate provided with magnetic scanning heads situated over the respective gear wheels. The thus mounted slotted wheels, which are made of magnetic metal, such as steel, the scanning heads, and the phase meter function to detect changes in speed of the grinding wheel. The outputs of the scanning heads are connected to a phase meter, the output of which, after being amplified, controls the in-feed speed of the grinding wheel.

3 Claims, 2 Drawing Figures

U.S. Patent    June 29, 1976    3,965,622

DEVICE FOR INDICATING THE TOUCHING OF A GRINDING WHEEL AND A WORKPIECE

This invention relates to a device for indicating the touching of a grinding wheel and a workpiece.

A great time loss and in this way a lower output of cylindrical grinding machines, as well as of surface grinding ones, is caused by so-called "grinding of air". The problem depends upon the fact that a grinding wheel may be in-fed quickly only up to a safe distance from a workpiece depending upon a maximum grinding allowance; after that the in-fed must be carried out slowly. According to the width of the allowance, and according to the speed of a grinding in-feed, it takes some time until the grinding wheel touches the workpiece and the proper grinding operation takes place. During this interval, which is a time loss, one "grinds air".

Because of this reason the operator tries to indicate a touch of a grinding wheel and workpiece, which makes it possible to carry out the in-feed motion at a higher speed, such speed being lowered to a grinding in-feed after the touch. In this way the time loss of a grinding of air may be substantially shortened.

Devices are known that indicate the touching of a grinding wheel and a workpiece in dependence upon a current increase of the electric motor driving the grinding wheel. This device may be advantageously applied in internal grinding machines, where the current increase is great and an inertial mass of a grinding wheel is small. But these devices are slow and their sensitivity is insufficient.

Electrically conductive grinding wheels that connect an electric circuit when touching the workpiece, are employed for other devices. This entails a disadvantage due to the fact that one must apply special electrically conductive grinding wheels which are not produced in mass production.

There are also known optical devices which indicate sparks as a result of grinding. A dependence upon the kind of ground material, upon a cooling liquid, and a difficult assembly of a pick-up in the grinding area are disadvantages of those devices.

The device for indicating the touching of a grinding wheel and a workpiece according to the invention comprises a shaft connected to a spindle of a grinding wheel, a first slotted or gear wheel fixed to such shaft, and another, second identical slotted or gear wheel rotatably mounted on the shaft, the second gear wheel being connected by means of a spring to the shaft, and a stable supporting plate provided with scanning heads situated over the respective gear wheels, the outputs of the scanning heads being connected to a phase meter. The slotted wheels are made of magnetic metal, and the scanning heads are each provided with permanent magnet core and a coil in which an electrical pulse is generated upon the passage of each "tooth" of the respective slotted wheel past the respective magnet.

The device according to the invention makes possible a very sensitive and quick indication of a touching of a grinding wheel and a workpiece, and in this way a substantial shortening of a working cycle of grinding machines takes place.

The invention will now be described by way of example with reference to the accompanying drawings.

Figure 2:
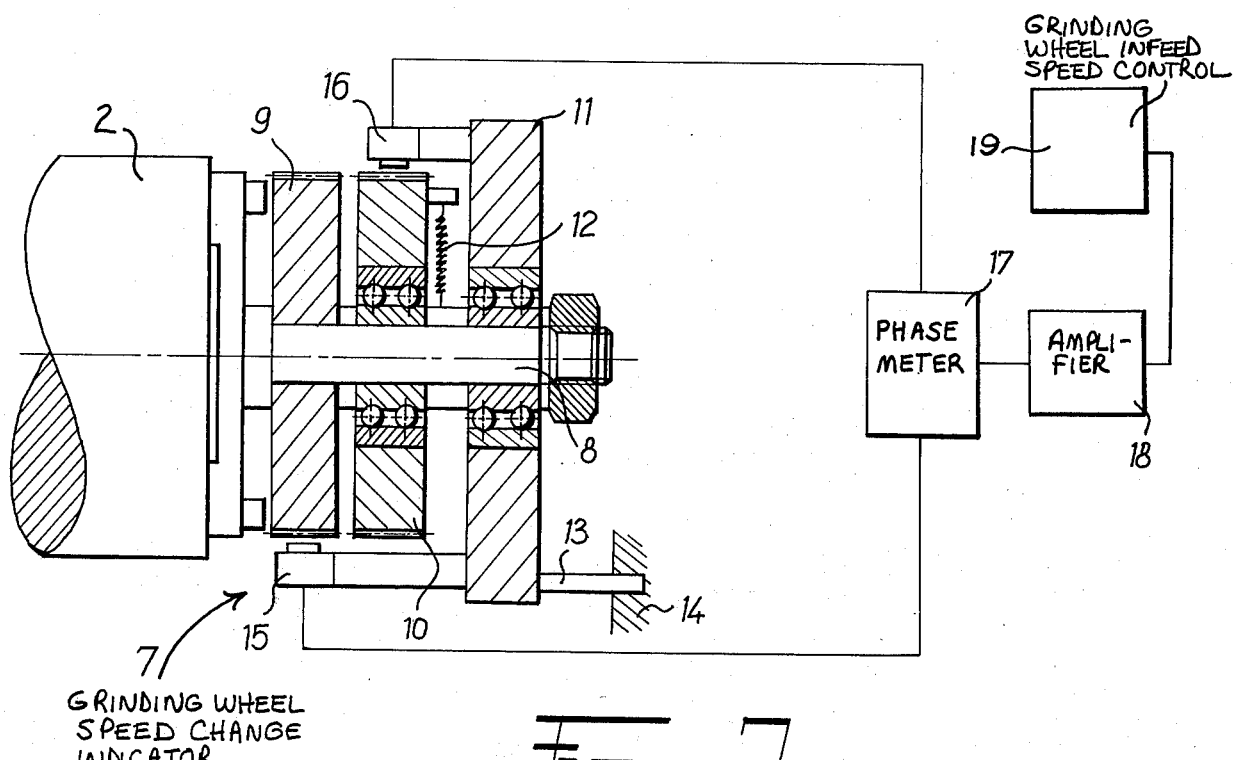

FIG. 1 is a schematic view in plan of a grinding wheel and workpiece of a cylindrical grinding machine; and FIG. 2 is a view partially in vertical section and partially in elevation of a seismograph for use in a lathe such as shown in FIG. 1.

In FIG. 1 there is shown a grinding wheel 1 fixed on a grinding spindle 2 driven via V-belts by an electric motor 3. A workpiece 4 is fixed in center of a working headstock 5 and tailstock 6. A "seismograph" 7 or speed change detector is fixed on the spindle of the grinding wheel 1. Before grinding, the grinding wheel 1 is fed to the workpiece 4 in the direction A at an in-feed speed $v_1$, which is approximately 10 times higher than a rough grinding in-feed speed $v_2$. When the grinding wheel 1 touches the workpiece 4, the grinding wheel 1 rotates a little slower, a condition indicated by the device 7. The output signal of the device 7 controls a device 19 (FIG. 2) for lowering the in-feed speed $v_1$ to the rough grinding in-feed speed $v_2$.

The illustrative device 7, shown in FIG. 2 consists of a shaft 8, rotatably mounted in a support plate 11, which is fixed onto the spindle of the grinding wheel 1. A first radially slotted or gear wheel 9 is fixed onto the shaft 8, and there is rotatably fitted upon shaft 8 an identical, second gear wheel 10. The revolving gear wheel 10 is carried along by means of a coil tension spring 12, connected between gear wheel 10 and shaft 8, as the shaft 8 rotates. Scanni-g heads 15, 16 disposed over the respective gear wheels 9, 10 are fixed on the supporting plate 11, which is braced to the frame 14 of the machine 14 by means of a rod 13 which holds plate 11 from rotation. The scanning heads 15, 16 include permanent magnets and coils.

When the gear wheels 9, 10 revolve, an alternating voltage or series of electrical pulses is induced in the scanning heads, the frequency of which depends upon the speed of revolution $n$ and upon the number of teeth $z$ of the gear wheels:

$$f = z \cdot n/60 \text{ Hz}$$

If the speed of rotation of the grinding wheel 1 and shaft 8 is uniform, the frequencies of both voltages are the same and the phase relationship between them is constant. If the grinding wheel 1 and shaft 8 rotate more quickly or slowly, the spring 12 is deformed (stretched) because of the inertia of the gear wheel 10, and the revolving gear wheel 10 is turned with respect to the fixed gear wheel 9. The pases of the voltages induced in the scanning heads 15, 16 are thus varied. The phase variation is evaluated by a phase meter 17, the output of which, after having been amplified in an amplifier 18, controls the lowering of the in-feed speed of the grinding wheel 1 by grinding wheel in-feeding means 19.

The device according to the invention has the advantage of a simple design, a high sensitivity, and great reliability.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In a device for indicating the touching of a grinding wheel and a workpiece in a grinding machine, said machine having a spindle to which a grinding wheel is affixed, said device comprising, in combination, a shaft connected to the spindle, a first magnetic gear wheel affixed to the shaft, a second identical magnetic gear wheel rotatably mounted on the shaft, the second gear wheel normally rotating in phase with the first gear wheel, a spring extending between the second gear wheel and the shaft for effecting a retardation in phase of the rotation of the second gear wheel with respect to the first gear wheel upon the touching of the grinding wheel and the workpiece, a pair of magnetic heads individually fixedly disposed in magnetic association with the peripheries of the first and second gear wheels for generating a pair of signals differing in phase in proportion to the retardation in phase of the second gear wheel relative to the first gear wheel, and a phase meter coupled to the outputs of the respective magnetic heads.

2. A device according to claim 1, wherein the spring is a coil tension spring.

3. A device according to claim 1, comprising an amplifier fed by the phase meter, and a grinding wheel in-feed controlling means fed by the amplifier, the parts being so constructed and arranged that upon the touching of the workpiece by the grinding wheel the rate of in-feeding of the grinding wheel is substantially decreased.

* * * * *